United States Patent
Lim et al.

(10) Patent No.: US 8,548,472 B2
(45) Date of Patent: Oct. 1, 2013

(54) METHOD AND APPARATUS FOR CELL SELECTION IN WIRELESS COMMUNICATION SYSTEM

(75) Inventors: Chi-Woo Lim, Suwon-si (KR); Mi-Hyun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 13/171,913

(22) Filed: Jun. 29, 2011

(65) Prior Publication Data

US 2012/0003978 A1 Jan. 5, 2012

(30) Foreign Application Priority Data

Jul. 2, 2010 (KR) ........................ 10-2010-0063650

(51) Int. Cl.
*H04W 36/00* (2009.01)
*H04W 24/00* (2009.01)
(52) U.S. Cl.
USPC ....................................... 455/436; 455/456.1
(58) Field of Classification Search
USPC .......... 455/404.1–404.2, 414.1–414.4, 422.1, 455/432.1–444, 453, 456.1–457; 370/310, 370/328–338, 342–350
See application file for complete search history.

(56) References Cited

U.S. PATENT DOCUMENTS

| | | | |
|---|---|---|---|
| 2004/0110503 A1* | 6/2004 | Park | 455/435.1 |
| 2008/0310384 A1* | 12/2008 | Shim et al. | 370/342 |
| 2009/0059857 A1* | 3/2009 | Kim et al. | 370/329 |
| 2009/0176507 A1* | 7/2009 | Wu et al. | 455/456.2 |
| 2010/0035633 A1* | 2/2010 | Park et al. | 455/456.1 |
| 2010/0124195 A1* | 5/2010 | Chun et al. | 370/329 |
| 2011/0201354 A1* | 8/2011 | Park et al. | 455/456.1 |

OTHER PUBLICATIONS

Mahmoud, H.A.; Arslan, H.; Ozdemir, M.K.; Initial Ranging for WiMAX (802.16e) OFDMA; Military Communications Conference, 2006. MILCOM 2006. IEEE; Publication Year: 2006 , pp. 1-7.*

* cited by examiner

*Primary Examiner* — Kashif Siddiqui
(74) *Attorney, Agent, or Firm* — Jefferson IP Law, LLP (57) ABSTRACT

A Mobile Station (MS) operation method for cell selection at initial access in a wireless communication system in which one or more small Base Stations (BSs) are included within a macro BS service coverage area is provided. The method includes performing synchronization based on a preamble signal, after performing the synchronization, transmitting a ranging code to a first BS, after transmitting the ranging code, transmitting a ranging request message including position information of the MS, to the first BS, and receiving a ranging response message including information on at least one candidate BS from the first BS. Thus, the MS can select a BS using position information of the MS in a wireless communication system in which various types of BSs coexist.

16 Claims, 5 Drawing Sheets

METHOD AND APPARATUS FOR CELL SELECTION IN WIRELESS COMMUNICATION SYSTEM

PRIORITY

This application claims the benefit under 35 U.S.C. §119 (a) of a Korean patent application filed in the Korean Intellectual Property Office on Jul. 2, 2010 and assigned Serial No. 10-2010-0063650, the entire disclosure of which is hereby incorporated by reference.

BACKGROUND OF THE INVENTION

1. Field of the Invention

The present invention relates to cell selection in a wireless communication system. More particularly, the present invention relates to a method and apparatus for, upon network entry, efficiently selecting a cell in a wireless environment in which a plurality of femto cells, pico cells, and repeaters coexist within a macro cell.

2. Description of the Related Art

In a cellular communication network, for example, in an Orthogonal Frequency Division Multiple Access (OFDMA) communication network, a Base Station (BS) exists in every cell and performs communication with at least one Mobile Station (MS) within the cell. When the MS first operates (or the MS powers on), the MS performs an initial cell search and connects with the cellular communication network. The initial cell search includes a downlink synchronization procedure between the BS and the MS, in which the BS transmits a synchronization signal to the MS. The synchronization signal is called a preamble, a synchronization channel or a cell identifier (or a preamble identifier). Also, the synchronization signal may include one synchronization channel, or include a 1st synchronization channel and a 2nd synchronization channel, or include one long preamble and a plurality of short preambles. Each BS within an area has a unique preamble or a cell identifier.

On the other hand, various types of small BSs (i.e., pico cells and femto cells) coexist within constant coverage and are used in order to increase system capacity in a cellular communication network. That is, a pico BS covering a pico cell, a femto BS covering a femto cell, and the like are called small BSs. The small BS expands indoor coverage, improves call quality, and more efficiently provides various wired/wireless fusion services. In this wireless communication system in which a plurality of small BSs coexist within a macro cell, the total system capacity may be improved.

However, despite the fact that various types of small BSs should be efficiently used in a wireless communication system covered by a macro BS, there is currently no sufficient method for performing this function. For instance, BSs of various forms may generally coexist within the service coverage area of a macro BS. In this case, when using an existing BS selection method, an MS typically selects the macro BS, making it impossible to achieve the original purpose of improving the total system capacity. Here, the existing BS selection method is a method of selecting a BS with a high reception strength based on a reception strength of a preamble (i.e., a signal including a synchronization and BS identifier) of each BS. However, including various types of BSs within a macro BSs service coverage area as described above is for increasing the total system capacity. To achieve this purpose, it should be allowed for MSs within the macro BSs service coverage area to be able to select any of the various types of BSs most effectively.

Accordingly, there is a need for a method and apparatus for efficiently selecting a cell in a wireless communication system in which a plurality of femto cells, pico cells, and repeaters coexist within a macro cell.

SUMMARY OF THE INVENTION

Aspects of the present invention are to address at least the above-mentioned problems and/or disadvantages and to provide at least the advantages described below. Accordingly, an aspect of the present invention is to provide a method and apparatus for cell selection in a wireless communication system in which Base Stations (BSs) of various forms exist.

Another aspect of the present invention is to provide a method and apparatus for performing cell selection based on a position of a Mobile Station (MS) to increase a system capacity in a wireless communication system in which BSs of various forms exist.

The above aspects are achieved by providing a method and apparatus for cell selection in a wireless communication system.

According to an aspect of the present invention, an MS operation method for cell selection at initial access in a wireless communication system in which one or more small BSs are included within a macro BS service coverage area is provided. The method includes performing synchronization based on a preamble signal, after performing the synchronization, transmitting a ranging code to a first BS, after transmitting the ranging code, transmitting a ranging request message including position information of the MS, to the first BS, and receiving a ranging response message including information on at least one candidate BS from the first BS. The first BS is one of the macro BS and the one or more small BSs.

According to another aspect of the present invention, a BS operation method for cell selection at initial access in a wireless communication system in which one or more small BSs are included within a macro BS service coverage area is provided. The method includes, after broadcasting a preamble signal, receiving a ranging code from a MS, after receiving the ranging code, receiving a ranging request message including position information of the MS, from the MS, selecting information on at least one candidate BS, based on the position information of the MS, and transmitting a ranging response message, including the information on the at least one candidate BS, to the MS.

According to a further aspect of the present invention, an MS apparatus for cell selection at initial access in a wireless communication system in which one or more small BSs are included within a macro BS service coverage area is provided. The apparatus includes a controller, a Radio Frequency (RF) transmitter, and an RF receiver. The controller performs synchronization based on a preamble signal. After the synchronization, the RF transmitter transmits a ranging code to a first BS and, after transmitting the ranging code, transmits a ranging request message including position information of the MS, to the first BS. The RF receiver receives a ranging response message including information on at least one candidate BS from the first BS. The first BS is one of the macro BS and the one or more small BSs.

According to yet another aspect of the present invention, a BS apparatus for cell selection at initial access in a wireless communication system in which one or more small BSs are included within a macro BS service coverage area is provided. The apparatus includes an RF receiver, a cell selector, and an RF transmitter. After broadcasting a preamble signal, the RF receiver receives a ranging code from a MS and, after receiving the ranging code, receives a ranging request message including position information of the MS, from the MS. The cell selector selects information on at least one candidate BS, based on the position information of the MS. The RF transmitter transmits a ranging response message, including the information on the at least one candidate BS, to the MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Below, exemplary embodiments of the present invention provide a method and apparatus for cell selection in a wireless communication system in which a plurality of small Base Stations (BSs) coexist within a macro cell. More particularly, the exemplary embodiments of the present invention provide a method for selecting a cell or BS based on a position of a Mobile Station (MS), rather than the strength of a received preamble signal, when the MS selects the BS in a wireless communication system in which BSs of various forms coexist. In the following description, cell selection and BS selection have the same meaning. Also, a BS identifier and a preamble identifier have the same meaning. Furthermore, a cell represents the service coverage area of a BS.

Figure 1:
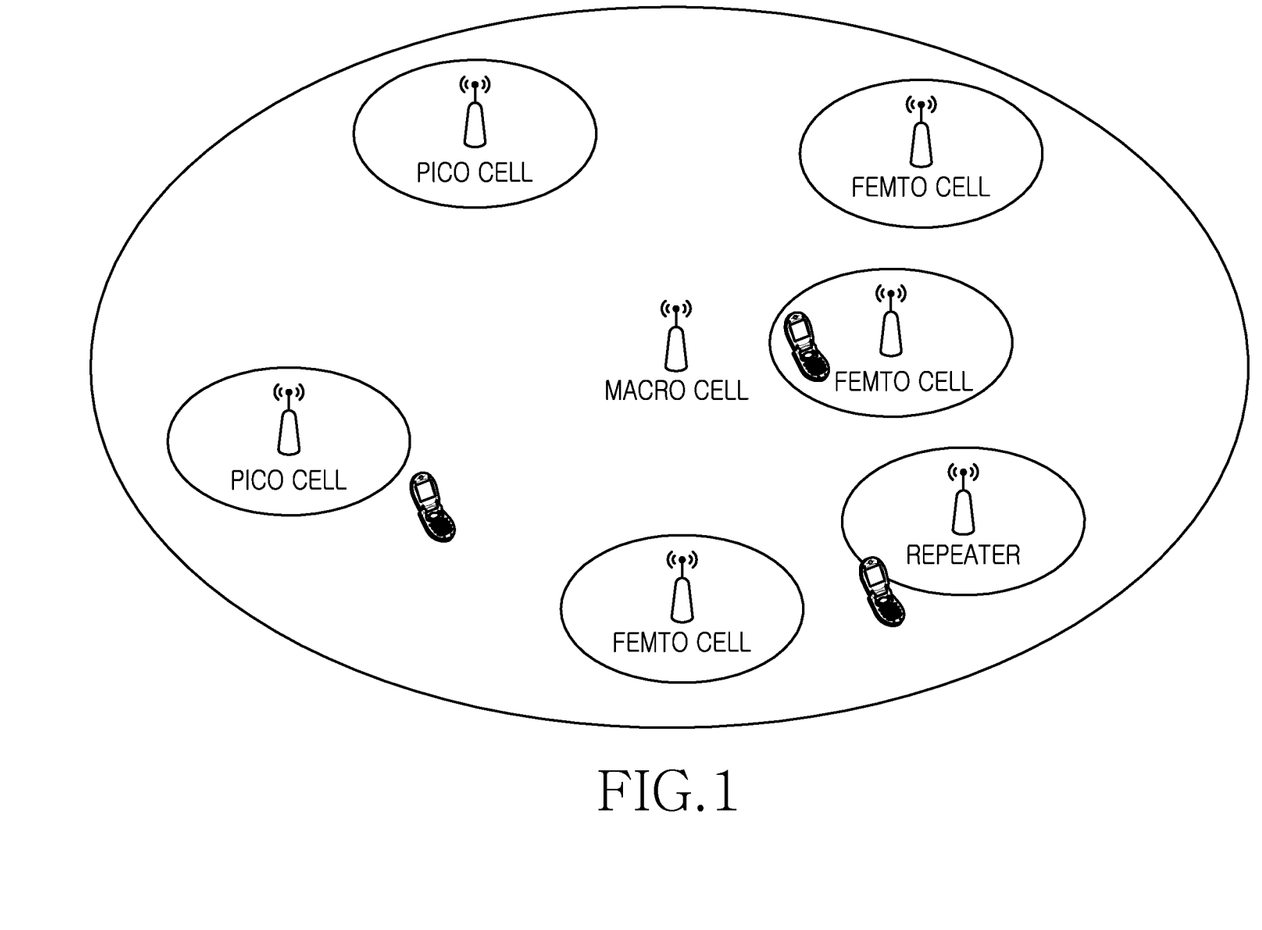
FIG. 1 is diagram illustrating a wireless communication system according to an exemplary embodiment of the present invention.

FIG. 1 illustrates a wireless communication system according to an exemplary embodiment of the present invention.

Referring to FIG. 1, BSs of various forms (i.e., macro BSs, pico BSs, femto BSs, repeaters, and the like) coexist within constant coverage in order to increase system capacity in a wireless communication system. On the other hand, to increase the capacity in this communication environment, exemplary embodiments of the present invention do not use a BS selection method based on a reception strength of a preamble.

That is, to increase system capacity in a wireless environment in which BSs of various forms coexist, exemplary embodiments of the present invention select a BS more effectively in an initial stage (i.e., when an MS powers on). This means that some MSs should be serviced through a BS (i.e., a femto BS, a pico BS) other than a macro BS, and other MSs should be serviced through the macro BS. In an exemplary implementation, BS selection is not made solely on the basis of the strength of a preamble received by an MS. In other words, because transmit power per BS is different, in spite of an MS having to be actually serviced through a neighboring BS other than a macro BS (i.e., a femto BS, a pico BS), if the MS selects the macro BS as a serving BS only because the macro BS has high reception power, the MS may not achieve the purpose of increasing capacity.

In order to address this problem, exemplary embodiments of the present invention propose a method for selecting a BS on the basis of position information of an MS, rather than the strength of a received preamble.

It is known that the position information of an MS may be determined by a BS. However, exemplary embodiments of the present invention propose a method in which an MS determines its position information using a Global Positioning System (GPS) receiver and informs a BS of this position information. Also, the BS selects an optimal BS based on this position information. However, the position information of the MS may be acquired by means of a different position information providing service, such as a Location Based Service (LBS), without being limited to the GPS receiver.

Figure 2:
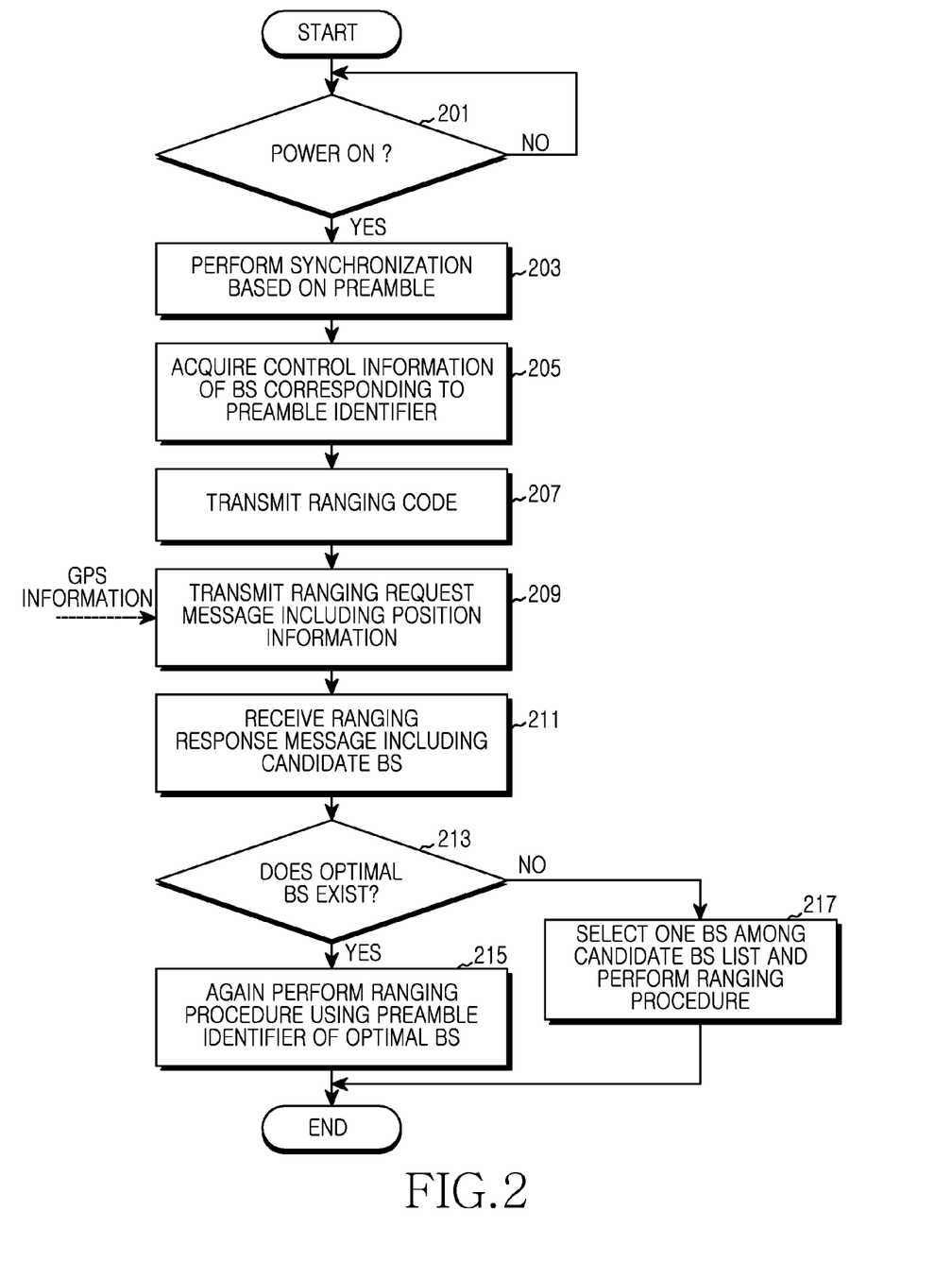
FIG. 2 is a flowchart illustrating a Mobile Station (MS) operation for a cell selection procedure in a wireless communication system according to an exemplary embodiment of the present invention.

FIG. 2 illustrates an MS operation for a cell selection procedure in a wireless communication system according to an exemplary embodiment of the present invention.

Referring to FIG. 2, if an MS powers on in step 201, the MS proceeds to step 203 and performs synchronization based on a preamble signal received from a BS. At this time, the MS acquires a BS identifier through the received preamble signal.

Generally, the acquired BS identifier (or preamble identifier) is an identifier value transmitted through the preamble signal received at the highest reception strength. According to an exemplary implementation, the MS may select a preamble signal having a signal strength greater than a threshold value.

In step 205, the MS acquires control information of a BS corresponding to the acquired BS identifier (or preamble identifier). The control information includes different types of information including information used by the MS for identifying a resource region for transmitting a ranging signal. After acquiring the control information, the MS performs a predefined ranging procedure (e.g., steps 207 to 217 below).

In step 207, the MS transmits a ranging code to the BS through a corresponding resource region.

If the transmitted ranging code is successfully received by the BS, in step 209, the MS is allocated a resource region for transmitting a RaNGing REQuest (RNG-REQ) message from the BS, and transmits the RNG-REQ message to the BS. The RNG-REQ message includes position information of the MS for cell selection or BS selection. Here, the position information of the MS may be determined through a GPS receiver of the MS and, at this time, the determined information is generally a latitude, longitude, and height value for a position. Among this information, the latitude and longitude information should be necessarily transmitted but, in some cases, the height information may not be transmitted. The latitude and longitude information and so on are previously defined and transmitted or are converted into a bit number known through control information and transmitted. In an alternative embodiment, the position information may be acquired by means of a different position information providing service, such as an LBS, without being limited to the GPS receiver.

In step 211, the MS receives a RaNGing ReSPonse (RNG-RSP) message including one or more candidate BSs and, in step 213, the MS determines if an optimal BS is included within the RNG-RSP message.

If it is determined in step 213 that one optimal BS is included within the RNG-RSP message, in step 215, the MS again performs a ranging procedure using a preamble identifier of the optimal BS.

If it is identified in step 213 that one optimal BS is not included (i.e., when a candidate BS list is included), the MS proceeds to step 217 and selects one BS among the candidate BS list and again performs a ranging procedure.

Figure 3:
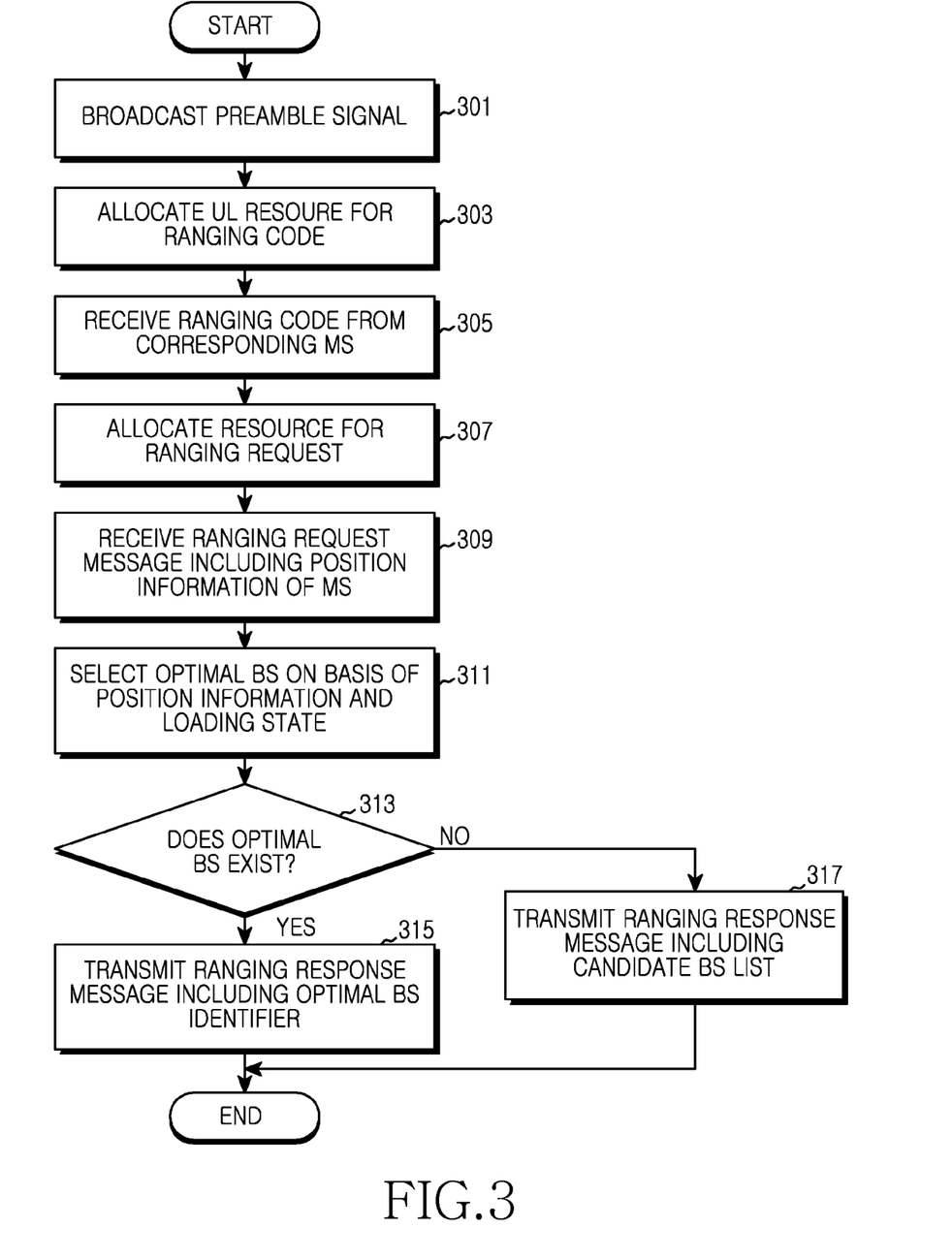
FIG. 3 is a flowchart illustrating a Base Station (BS) operation for a cell selection procedure in a wireless communication system according to an exemplary embodiment of the present invention.

FIG. 3 illustrates a BS operation for a cell selection procedure in a wireless communication system according to an exemplary embodiment of the present invention.

Referring to FIG. 3, in step 301, a BS broadcasts a preamble signal and, in step 303, the BS allocates an UpLink (UL) resource to an MS such that the MS transmits a ranging code to the BS.

In step 305, the BS receives the ranging code from the MS and, in step 307, the BS allocates the MS a UL resource for RNG-REQ message transmission.

In step 309, the BS receives the RNG-REQ message from the MS through the allocated UL resource. The RNG-REQ message includes position information of the MS for cell selection or BS selection. Here, the position information of the MS may be determined through a GPS receiver of the MS. Alternatively, the position information may be acquired by a different position information providing service, such as an LBS, without being limited to the GPS receiver.

In step 311, the BS selects an optimal serving BS by considering the position information of the MS included in the RNG-REQ message and a position and loading of each BS. At this time, the BS may select a specific BS, or may select a plurality of BSs. In an exemplary implementation, it is assumed that the BS has previously shared position information or loading with other BSs and the like through mutual information exchange. That is, the BS receiving the RNG-REQ from an MS determines position information of the MS, position information and loading of each BS and the like, and selects an optimal BS for the MS.

For instance, when there is an RNG-REQ from the MS, the BS selects one or more small BSs that increase the system capacity among other small BSs neighboring the MS, based on the position information of the MS.

In step 313, the BS determines if one optimal BS is selected. If the BS determines that one BS is as an optimal BS in step 313, the BS proceeds to step 315 and transmits a BS identifier (or preamble identifier) to the MS through an RNG-RSP message. At this time, the MS again attempts a ranging procedure with a BS based on the BS identifier (or preamble identifier) included in the RNG-RSP message.

In contrast, if the BS determines in step 313 that there are a plurality of BSs selected, the BS transmits a candidate BS list through the RNG-RSP message in step 317. In this case, the MS may select a BS having a high strength of a received preamble signal among BSs included in the candidate BS list, and attempts a ranging procedure to the selected BS.

Figure 4:
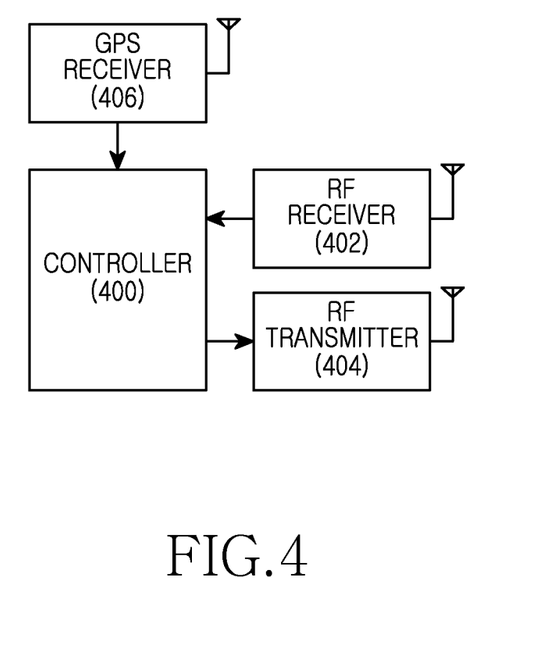
FIG. 4 is a block diagram illustrating an MS apparatus for a cell selection procedure in a wireless communication system according to an exemplary embodiment of the present invention.

FIG. 4 illustrates an MS apparatus for a cell selection procedure in a wireless communication system according to an exemplary embodiment of the present invention.

Referring to FIG. 4, the MS includes a Radio Frequency (RF) receiver 402, an RF transmitter 404, a controller 400, and a GPS receiver 406.

The RF receiver 402 converts an RF signal received through an antenna into a baseband analog signal, and converts the analog signal into sample data. And, the RF receiver 402 processes, by Fast Fourier Transform (FFT), the sample data to output frequency domain data, selects data of subcarriers intended for actual reception, demodulates and decodes the selected data according to a predefined modulation level (i.e., a Modulation and Coding Scheme (MCS) level), and outputs the data to the controller 400. For example, the RF receiver 402 receives an RNG-RSP message from a BS and provides the RNG-RSP message to the controller 400.

The controller 400 performs a general control of the MS, performs corresponding processing for information provided from the RF receiver 402, and provides the result to the RF transmitter 404.

The controller 400 also performs synchronization based on a preamble signal received from a BS. At this time, the MS acquires a BS identifier through the received preamble signal. And, the controller 400 acquires control information of the BS corresponding to the acquired BS identifier (or preamble identifier). The control information includes several pieces of information, and the MS acquires information able to identify a region capable of transmitting a ranging signal among this information. If acquiring the control information, the MS performs a predefined ranging procedure.

More particularly, the controller 400 transmits an RNG-REQ message including position information of the MS to a BS such that the BS selects a BS optimal to the MS. The position information of the MS is provided to the GPS receiver 406.

After that, the controller 400 receives an RNG-RSP message including one or more candidate BSs and attempts a ranging procedure to a BS.

For instance, when one optimal BS is included in the RNG-RSP message, the controller 400 of the MS again performs a ranging procedure using a preamble identifier of the optimal BS. When the optimal BS is not included (i.e., when a candidate BS list is included), the controller 400 selects one BS from the candidate BS list and again performs a ranging procedure.

The RF transmitter 404 generates a message with various pieces of information input from the controller 400, and encodes and modulates the message according to a predefined modulation level (i.e., an MCS level). And, the RF transmitter 404 processes, by Inverse Fast Fourier Transform (IFFT), modulated data to output sample data (i.e., OFDM symbols), and converts the sample data into an analog signal. Also, the RF transmitter 404 converts the analog signal into an RF signal and transmits the RF signal through an antenna. For example, the RF transmitter 404 transmits, to a BS, an RNG-REQ message from the controller 400.

The GPS receiver 406 receives a signal of one of more satellites, amplifies the signals, analyzes the signal, determines a current position based on a triangulation method, and provides the determined position to the controller 400.

Figure 5:
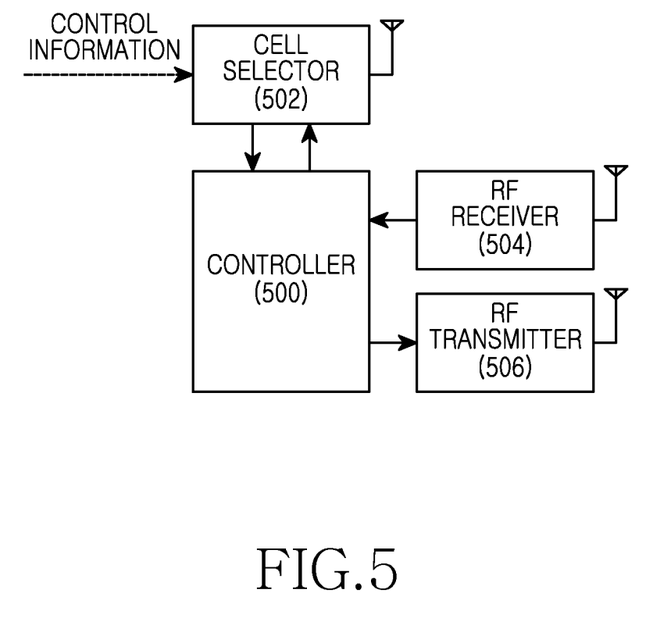
FIG. 5 is a block diagram illustrating a BS apparatus for a cell selection procedure in a wireless communication system according to an exemplary embodiment of the present invention.

FIG. 5 illustrates a BS apparatus for a cell selection procedure in a wireless communication system according to an exemplary embodiment of the present invention.

Referring to FIG. 5, a BS includes an RF receiver 504, an RF transmitter 506, a controller 500, and a cell selector 502.

The RF receiver 504 converts an RF signal received through an antenna into a baseband analog signal, and converts the analog signal into sample data. And, the RF receiver 504 processes, by FFT, the sample data to output frequency domain data, selects data of subcarriers intended for actual reception from the frequency domain data, demodulates and decodes the selected data according to a predefined modulation level (i.e., an MCS level), and outputs the data to the controller 500. For example, the RF receiver 504 receives an RNG-REQ message from the MS and provides the RNG-REQ message to the controller 500. The RNG-REQ message includes position information of the MS for cell selection or BS selection.

The controller 500 performs a general control of the BS, performs corresponding processing for information provided from the RF receiver 504, and provides the result to the RF transmitter 506.

And, the controller 500 broadcasts a preamble signal through the RF transmitter 506, and allocates a UL resource to an MS such that the MS transmits a ranging code to the BS. Also, when receiving the ranging code from the MS, the controller 500 allocates the MS a UL resource for RNG-REQ message transmission.

The cell selector 502 selects an optimal serving BS considering position information of an MS, and a position and loading of each BS. At this time, the BS may select one specific BS, or may select a plurality of BSs. In an exemplary implementation, it is assumed that the BS previously shares position information or loading with other BSs and the like through mutual information exchange. That is, each BS determines position information of an MS, position information and loading of each BS and the like, and selects a BS optimal to the MS.

The RF transmitter 506 generates a message with various pieces of information input from the controller 500 and encodes and modulates the message according to a predefined modulation level (i.e., an MCS level). And, the RF transmitter 506 processes, by IFFT, modulated data to output sample data (i.e., OFDM symbols), and converts the sample data into an analog signal. Also, the RF transmitter 506 converts the analog signal into an RF signal and transmits the RF signal through an antenna. For example, the RF transmitter 506 transmits, to an MS, an RNG-RSP message from the controller 500. The RNG-RSP message includes one or more selected BS identifier information.

As described above, exemplary embodiments of the present invention have an advantage of being capable of increasing a system capacity by selecting a BS using position information of an MS in a wireless communication system in which various types of BSs coexist.

While the invention has been shown and described with reference to certain exemplary embodiments thereof, it will be understood by those skilled in the art that various changes in form and details may be made therein without departing from the spirit and scope of the invention as defined by the appended claims, and their equivalents.

What is claimed is:

1. A Mobile Station (MS) operation method for cell selection at initial access in a wireless communication system in which one or more micro Base Stations (BSs) are comprised within a macro BS service coverage area, the method comprising:
   powering on;
   obtaining position information of the MS;
   performing an initial synchronization based on a preamble signal;
   after performing the initial synchronization, transmitting a ranging code to a first BS;
   after transmitting the ranging code, transmitting a ranging request message comprising the position information of the MS to the first BS; and
   receiving a ranging response message comprising information on at least one candidate BS from the first BS;
   determining a candidate BS with a highest preamble signal strength among the at least one candidate BS; and
   performing a ranging procedure to the candidate BS,
   wherein the first BS includes the macro BS,
   wherein the at least one candidate BS includes at least one micro BS,
   wherein the at least one candidate BS is selected so that a system capacity is increased, by the first BS, by considering the position information of the MS, and a position and loading of each of the one or more micro BSs and the macro BS, and
   wherein the position and the loading of each of the one or more micro BSs and the macro BS are shared through mutual information exchange.

2. The method of claim 1, wherein the obtaining of the position information further comprises determining the position information of the MS using a Global Positioning System (GPS) receiver.

3. The method of claim 1, wherein the information on the at least one candidate BS comprises at least one of a BS identifier and a preamble identifier.

4. The method of claim 1, wherein the position information of the MS comprises at least one of a latitude, a longitude, and a height value.

5. A Base Station (BS) operation method for cell selection at initial access in a wireless communication system in which one or more micro BSs are comprised within a macro BS service coverage area, the method comprising:
   after broadcasting a preamble signal, receiving at the macro BS or at a micro BS within the macro BS service coverage area a ranging code from a Mobile Station (MS);
   after receiving the ranging code, receiving a ranging request message comprising position information of the MS, from the MS;
   selecting information on at least one candidate BS, based on the position information of the MS, wherein the at least one candidate BS may comprise the macro BS and may comprise the micro BS; and transmitting a ranging response message, comprising the information on the at least one candidate BS, to the MS, wherein the selecting of the information on the at least one candidate BS comprises selecting of the information on the at least one candidate BS that increases a system capacity by considering the position information of the MS, and a position and loading of each of the none or more micro BSs and the macro BS, and wherein the position and the loading of each of the one or more micro BSs and the macro BS are shared through mutual information exchange.

6. The method of claim 5, wherein, when one BS is selected as the at least one candidate BS, an identifier of the selected one BS is included in the ranging response message, and wherein, when a plurality of BSs are selected as the at least one candidate BS, a BS list is included in the ranging response message.

7. The method of claim 5, wherein the information on the at least one candidate BS comprises at least one of a BS identifier and a preamble identifier.

8. The method of claim 5, wherein the position information of the MS comprises at least one of a latitude, a longitude, and a height value.

9. A Mobile Station (MS) apparatus for cell selection at initial access in a wireless communication system in which one or more micro Base Stations (BSs) are comprised within a macro BS service coverage area, the apparatus comprising:

a positioning unit for obtaining position information of the MS;

a Radio Frequency (RF) transmitter for, after an initial synchronization, transmitting a ranging code to a first BS and, after transmitting the ranging code, for transmitting a ranging request message comprising the position information of the MS, to the first BS;

an RF receiver for receiving a ranging response message comprising information on at least one candidate BS from the first BS; and a controller for performing the initial synchronization based on a preamble signal, for determining a candidate BS with a highest preamble signal strength among the at least one candidate BS, and for performing a ranging procedure to the candidate BS, wherein the first BS includes the macro BS, wherein the at least one candidate BS includes at least one micro BS, wherein the at least one candidate BS is selected so that a system capacity is increased, by the first BS, by considering the position information of the MS, and a position and loading of each of the one or more micro BSs and the macro BS, and wherein the position and the loading of each of the one or more micro BSs and the macro BS are shared through mutual information exchange.

10. The apparatus of claim 9, wherein the positioning unit further comprises a Global Positioning System (GPS) receiver for determining the position information of the MS.

11. The apparatus of claim 9, wherein the information on the at least one BS comprises at least one of a BS identifier and a preamble identifier.

12. The apparatus of claim 9, wherein the position information of the MS comprises at least one of a latitude, a longitude, and a height value.

13. A Base Station (BS) apparatus for cell selection at initial access in a wireless communication system in which one or more micro BSs are comprised within a macro BS service coverage area, the apparatus comprising:

a Radio Frequency (RF) receiver for, after broadcasting a preamble signal, receiving at the macro BS or at a micro BS within the macro BS service coverage area a ranging code from a Mobile Station (MS) and, after receiving the ranging code, for receiving a ranging request message comprising position information of the MS, from the MS;

a cell selector for selecting information on at least one candidate BS, based on the position information of the MS, wherein the at least one candidate BS may comprise the macro BS and may comprise the micro BS; and an RF transmitter for transmitting a ranging response message, comprising the information on the at least one candidate BS, to the MS, wherein, when the selector selects the information on the at least one candidate BS, the cell selector selects the information on the at least one candidate BS that increases a system capacity by considering the position information of the MS, and a position and loading of each of the one or more micro BSs and the macro BS, and wherein the position and the loading of each of the one or more micro BSs and the macro BS are shared through mutual information exchange.

14. The apparatus of claim 13, wherein, when one BS is selected as the at least one candidate BS, an identifier of the selected one BS is included in the ranging response message, and wherein, when a plurality of BSs are selected as the at least one candidate BS, a BS list is included in the ranging response message.

15. The apparatus of claim 13, wherein the information on the at least one candidate BS comprises at least one of a BS identifier and a preamble identifier.

16. The apparatus of claim 13, wherein the position information of the MS comprises at least one of a latitude, a longitude, and a height value.

* * * * *